United States Patent
Schunk et al.

(10) Patent No.: US 7,229,205 B2
(45) Date of Patent: Jun. 12, 2007

(54) DRIVE UNIT FOR PLASTICS INJECTION MACHINES

(75) Inventors: Holger Schunk, Lendershausen (DE); Andreas Tschanter, Heustreu (DE)

(73) Assignee: Siemens Aktiengesellschaft, München (DE)

( * ) Notice: Subject to any disclaimer, the term of this patent is extended or adjusted under 35 U.S.C. 154(b) by 484 days.

(21) Appl. No.: 10/841,942

(22) Filed: May 7, 2004

(65) Prior Publication Data

US 2004/0223403 A1    Nov. 11, 2004

(30) Foreign Application Priority Data

May 8, 2003    (DE) ............................... 103 20 599

(51) Int. Cl.
*B29B 7/80*    (2006.01)
(52) U.S. Cl. .................................................. 366/100
(58) Field of Classification Search ............... 366/100, 366/79, 318, 601; 425/208, 209, 204
See application file for complete search history.

(56) References Cited

U.S. PATENT DOCUMENTS

| 5,863,567 A * | 1/1999 | Klaus ........................ 425/145 |
|---|---|---|
| 6,632,009 B2 * | 10/2003 | Meyer ........................ 366/100 |
| 7,090,483 B2 * | 8/2006 | Middelberg ................. 425/162 |
| 7,112,902 B2 * | 9/2006 | Schunk et al. ................ 310/90 |
| 2005/0063245 A1 * | 3/2005 | Wohlrab ....................... 366/83 |

FOREIGN PATENT DOCUMENTS

| DE | 44 09 822 C2 | 6/1997 |
|---|---|---|
| DE | 101 35 539 A1 | 3/2003 |
| EP | 1 182 027 A1 | 2/2002 |
| JP | 2000108181 | 10/1998 |
| WO | WO 2004/005005 A1 | 1/2004 |

OTHER PUBLICATIONS

"Ohne Getriebe"; In: Plastverarbelter 2002, vol. 9, Seiten 84, 85.

* cited by examiner

*Primary Examiner*—Tony G. Soohoo
(74) *Attorney, Agent, or Firm*—Henry M. Feiereisen

(57) ABSTRACT

A drive unit for operating a plastics injection machine includes a rotatably supported bushing intended for accommodation of an extruder screw and a rotor which includes a hollow shaft and is defined by an inner diameter sized to allow passage of the bushing and accommodated extruder screw through the rotor. The rotor is hereby detachably connected with the receiving member in fixed rotative engagement.

13 Claims, 3 Drawing Sheets

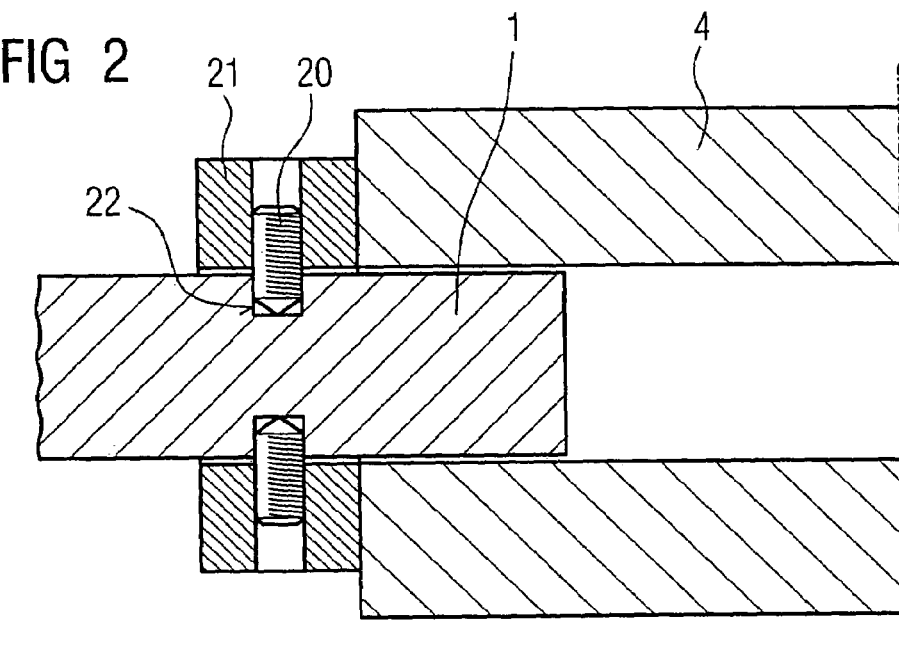
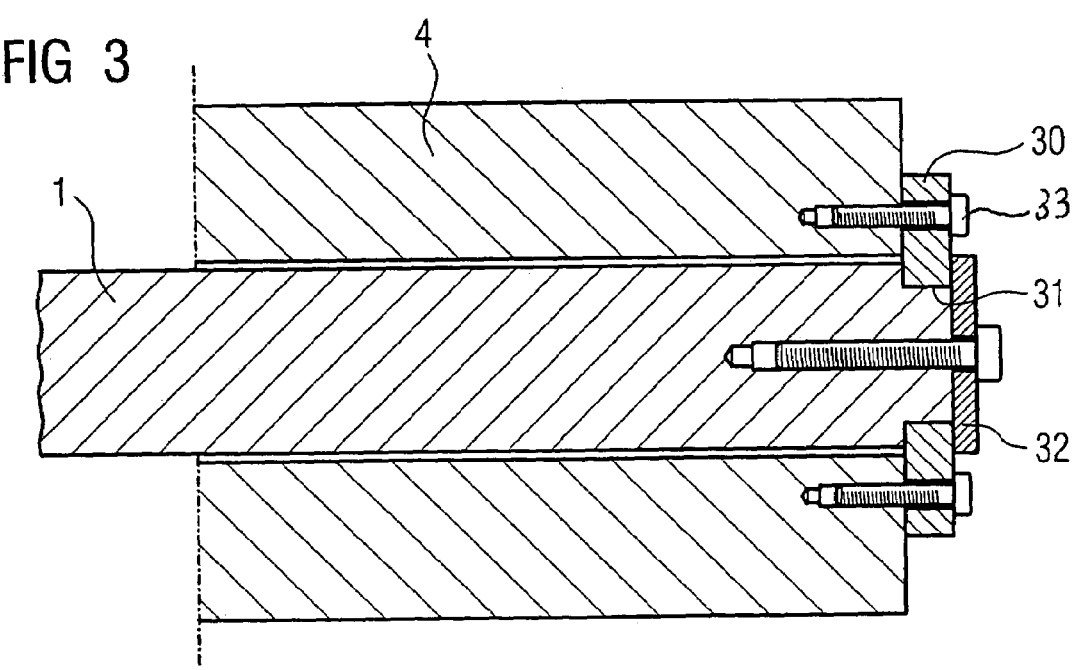

DRIVE UNIT FOR PLASTICS INJECTION MACHINES

CROSS-REFERENCES TO RELATED APPLICATIONS

This application claims the priority of German Patent Application, Serial No. 103 20 599.3, filed May 8, 2003, pursuant to 35 U.S.C. 119(a)–(d), the disclosure of which is incorporated herein by reference.

BACKGROUND OF THE INVENTION

The present invention relates to a drive unit for operating a plastics injection machine.

Plastics injection machines of a type involved here include an extruder having an extruder screw for producing a plastic melt and a drive for operating the extruder screw, and an injection unit which receives the plastic melt for introduction into a cavity of a mold. A problem facing an operator of such plastics injection machines is the necessity to remove the extruder screw from the machine for cleaning purposes, when injection material needs to be changed or after the machine has cooled down. Removal of the extruder screw is conceivable in two directions. On one hand, the extruder screw may be withdrawn through the front of the extruder, i.e. in a direction away from the drive. This approach requires, however, a dismantling of the extruder and thus is very complicated and essentially impractical. As an alternative, the extruder screw may be withdrawn through the rear of the extruder, i.e. in a direction toward the drive. This approach requires, however, an undesired dismantling of the drive.

It would therefore be desirable and advantageous to provide an improved plastics injection machine and in particular to so construct a drive unit to obviate prior art shortcomings and to allow a simple removal of the extruder screw.

SUMMARY OF THE INVENTION

According to one aspect of the present invention, a drive unit for operating a plastics injection machine includes a receiving member supported for rotation and intended for accommodation of an extruder screw, a rotor forming part of an electric machine, with the rotor being hollow cylindrical in shape and defined by an inner diameter sized to allow passage of the receiving member and accommodated extruder screw through the rotor, and a connection assembly for detachably connecting the rotor in fixed rotative engagement with the receiving member.

The present invention resolves prior art problems by configuring the drive unit in the form of a hollow-shaft direct drive with a feedthrough sized sufficiently to allow easy withdrawal of the extruder screw through the rear of the drive. Optionally, the extruder screw may also be withdrawn to the front of the drive.

According to another feature of the present invention, the connection assembly can be disposed inside the rotor. The connection assembly may hereby include a power transmission flange which projects into the rotor, and a restraining nut which is threadably engaged inside the rotor to the power transmission flange for axial support of the receiving member. By simply unscrewing the restraining nut from the power transmission flange on the extruder screw distal side, the extruder screw can be withdrawn through the hollow shaft of the rotor.

As an alternative, the connection assembly may also be arranged on the rotor side that is proximal to the extruder screw. In this case, the connection assembly may include one or more detachable catches which are engageable in the receiving member for torque transmission and axial securement. Removal of the extruder screw through the front or through the back requires only a disengagement of the catches from e.g. a rotor extension.

As another alternative, the connection assembly may also be arranged on the rotor side that is distal to the extruder screw. The connection assembly may hereby include a disk which is connected to the receiving member and detachably mounted to the rotor. Suitably, the disk may be connected to the receiving member to form a single-piece construction. The provision of the disk allows the receiving member to be flange-mounted to the rotor. After unscrewing the disk, the extruder screw can be pulled out through the back of the rotor.

According to another feature of the present invention, a bearing assembly may be provided for axial support of the rotor and the receiving member in both directions. This is desired in situations when the extruder screw exerts tensile forces as well as pressure forces upon the receiving member. The bearing unit may include a separate axial bearing constructed to absorb pressure forces in the direction from the extruder screw to the rotor. Tensile forces are significantly smaller than the pressure forces so that the axial bearing for absorbing tensile forces in the direction from the rotor to the extruder screw may include a radial bearing which is also able to absorb axial forces to some extent. As a result, the use of a separate axial bearing to absorb tensile forces can be omitted.

According to another feature of the present invention, the connection assembly may include a gear mechanism disposed between the rotor and the receiving member.

According to another aspect of the present invention, a plastics injection machine includes an extruder screw, and a drive unit for operating the extruder screw, with the drive unit comprising a receiving member supported for rotation and intended for accommodation of the extruder screw, a rotor forming part of an electric machine, with the rotor being hollow cylindrical in shape and defined by an inner diameter sized to allow passage of the receiving member and received extruder screw through the rotor, and a connection assembly for detachably connecting the rotor in fixed rotative engagement with the receiving member.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is an enlarged detailed cross sectional view of a second variation of a connection assembly between the rotor and the receiving member of the direct drive of FIG. 1;

FIG. 3 is an enlarged detailed cross sectional view of a third variation of a connection assembly between the rotor and the receiving member of the direct drive of FIG. 1.

DETAILED DESCRIPTION OF PREFERRED EMBODIMENTS

Figure 1:
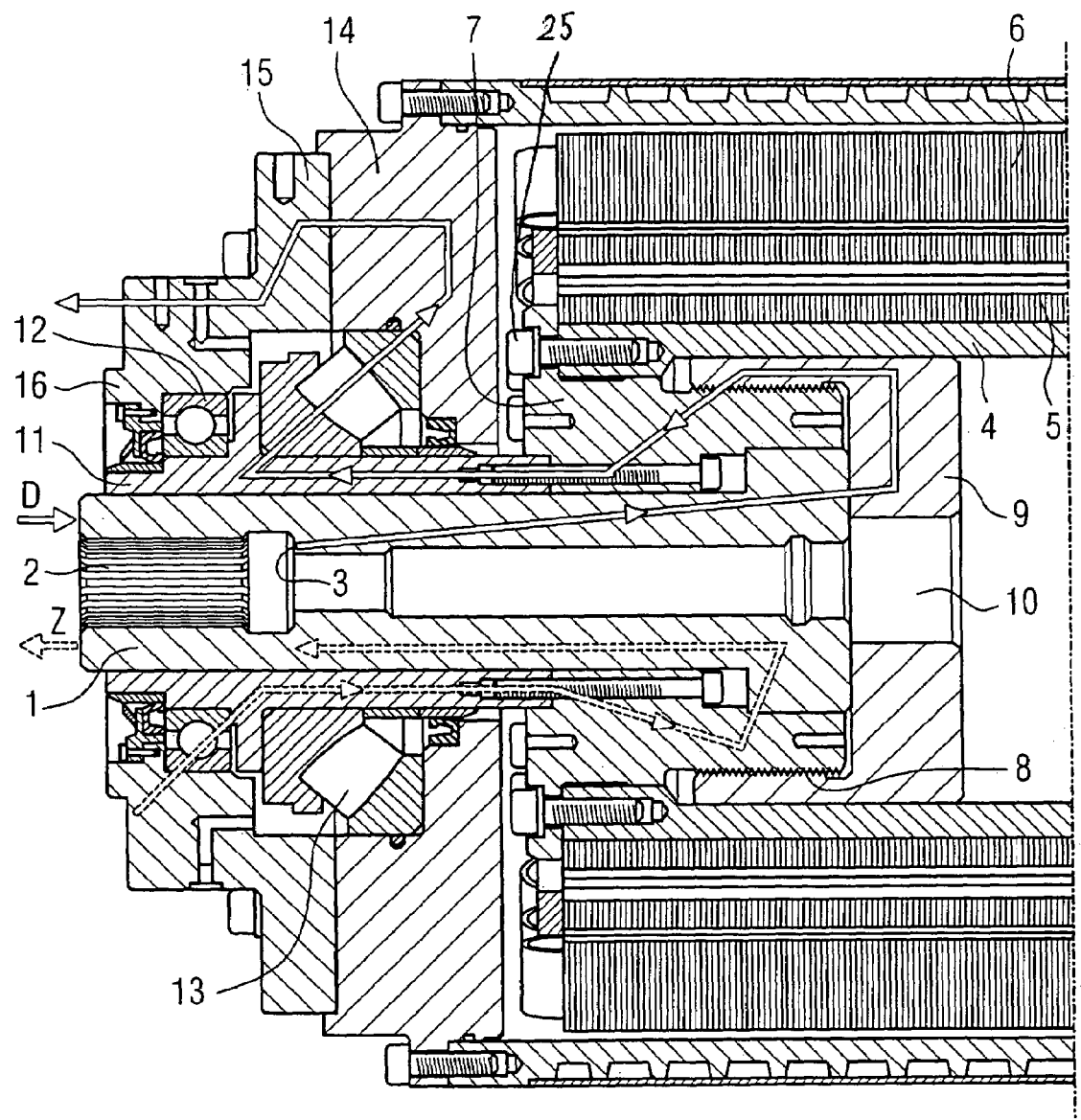
FIG. 1 is a cross sectional view of a front portion of a direct drive according to the present invention, illustrating a first variation of a connection assembly between a rotor and a receiving member of the direct drive of FIG. 1.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross sectional view of a front portion of a direct drive according to the present invention, including a bushing 1 as receiving member for placement of an extruder screw (not shown) from a left-hand side in FIG. 1. The extruder screw is hereby supported in axial direction by a shoulder 3 of the bushing 1 and secured to a splined portion 2 for torque transmission. The bushing 1 projects axially into the interior of a hollow shaft 4 which forms part of a rotor of an electric machine of the direct drive. The rotor further includes a rotor winding 5 which is mounted onto the hollow shaft 4. Disposed in spaced-apart surrounding relationship to the rotor is a stator 6 of the electric machine of the direct drive.

In proximity to the extruder screw, the hollow shaft 4 has one end surface for attachment of a power transmission flange 7 which is secured to the hollow shaft 4 by bolts 25 and forms part of a connection assembly for mounting the bushing 1 in fixed rotative engagement to the hollow shaft 4. The power transmission flange 7 extends into the interior of the hollow shaft 4 with a flange portion that includes an outer thread 8. Threadably engageable to the outer thread 8 is a restraining nut 9 for axial support of the bushing 1. The restraining nut 9 is formed in mid-section with a square opening 10 for application of a tool by which the restraining nut 9 can be unscrewed from the outer thread 8 and removed from the rotor at the side thereof that is distal to the extruder screw.

A sleeve 11 of tensile strength is threadably engaged in coaxial relationship to the power transmission flange 7 and extends in axial prolongation of the power transmission flange 7 in the direction toward the extruder screw. The sleeve 11 is supported via a radial bearing 12 and an axial bearing 13 in a bearing plate assembly comprised of three bearing plates 14, 15, 16 mounted in coaxial relationship. Both bearings 12, 13 are arranged behind one another in axial direction. The axial bearing 13 is hereby provided to absorb pressure forces applied by the extruder screw upon the direct drive. The radial support of the rotor is assumed by the radial bearing 12 on the side proximal to the extruder screw. Although not shown in FIG. 1, another radial bearing is disposed on the other screw-distal side of the rotor and has an inner diameter which is greater than the inner diameter of the radial bearing 12 on the screw-proximal side of the rotor. The reason for the difference in the dimensions of the inner diameter between the radial bearings on opposite sides of the rotor is the arrangement on the screw-proximal side of the axial bearing 13 which is able to also absorb radial forces, so that the radial bearing 12 on the screw-proximal side can be dimensioned smaller. Suitably, the radial bearings on opposite sides of the rotor are constructed as deep groove ball bearings.

When an axial pressure force D is applied as a consequence of a movement of the extruder screw, a force flux is established as indicated by the double line in FIG. 1. The force flux starts hereby at the shoulder 3 of the bushing 1 and progresses via the restraining nut 9, the power transmission flange 7, the sleeve 11 and the axial bearing to the bearing plate assembly 14, 15, 16.

As the extruder starts to operate, tensile forces are exerted upon the bearing assembly. These tensile forces are significantly smaller than the pressure forces and are absorbed by the radial bearings 12, as described above. A force flux Z of the tensile forces is indicated in FIG. 1 by the dashed double line. This force flux Z begins in one of the bearing plates 14, 15, or 16 and progresses via the radial bearing 12, the sleeve 11 and the power transmission flange 7 to the bushing 1 which receives the extruder screw.

The extruder screw has a diameter which is smaller than an inner diameter of the bushing 1. As a result, the extruder screw can be removed from the extruder by withdrawing the bushing 1 through the hollow rotor shaft 4, whereby the restraining nut 9 is unscrewed from the power transmission flange 7 beforehand.

Turning now to FIG. 2, there is shown a cross sectional view of an alternative connection assembly between the rotor and the bushing 1. Parts corresponding with those in FIG. 1 are denoted by identical reference numerals and not explained again. The description below will center on the differences between the embodiments. In this embodiment, provision is made for disposition of the connection assembly on the screw-proximal end surface of the rotor. The connection assembly between the rotor and the bushing 1 includes essentially a plurality of pin-like catches 20 which project through a rotor extension 21 into bores 22 of the bushing 1. The catches 20 assume hereby the transmission of the necessary torque to the extruder screw and the axial securement. Also this embodiment of the direct drive enables easy withdrawal of the extruder screw through the front or through the back by simply disengaging the catches 20 from the bushing 1.

FIG. 3 shows a cross sectional view of still another variation of a connection assembly between the rotor and the bushing 1. Parts corresponding with those in FIG. 1 are again denoted by identical reference numerals and not explained again. The description below will center on the differences between the embodiments. In this embodiment, the hollow rotor shaft 4 extends through the entire bushing 1. A disk 30 is disposed on the screw-distal end face of the hollow rotor shaft 4 and threadably engaged with the hollow rotor shaft 4 by bolts 33. The bushing 1 has a polygonal end portion for placement in a complementary polygonal opening 31 of the disk 30 for transmission of the torque from the hollow rotor shaft 4 to the bushing 1. A washer 32 secures the bushing 1 axially to the disk 30. Although not shown in FIG. 3, the disk 30 may also be constructed in single-piece configuration with the bushing 1.

Removal of the extruder screw through the front requires only a detachment of the washer 32 from the bushing 1. Removal of the extruder screw through the rear requires detachment of the disk 30 from the hollow rotor shaft 4. In the event the disk 30 is constructed in single-piece configuration with the bushing 1, the extruder screw can only be removed through the back of the drive.

Figure 4:
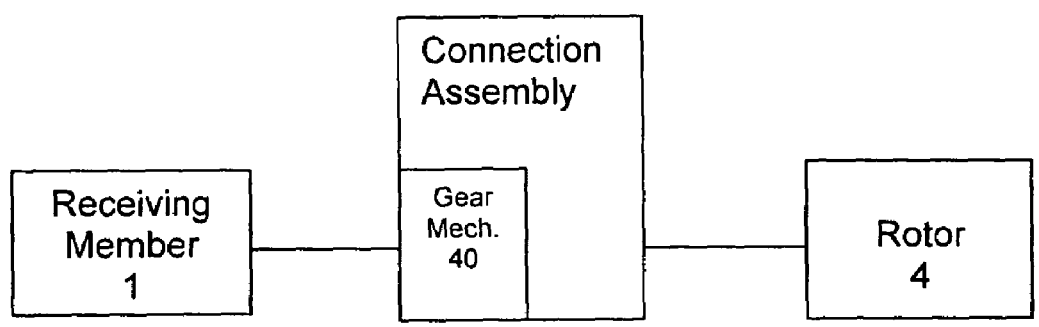
FIG. 4 is a schematic block diagram of a fourth variation of a connection assembly between the rotor and the receiving member of the direct drive of FIG. 1.

In view of the fact that the extruder screw can be withdrawn in all embodiments according to the present invention without any further components at least through the rear of the drive, without necessitating a dismantling of the extruder screw, a directly driven extruder can be realized with much improved handling capability. Of course, it is also conceivable to provide a drive with a hollow rotor shaft 4 that drives the extruder screw indirectly through intervention of a gear mechanism 40, as shown by way of example in FIG. 4. Also in this case, removal of the extruder screw may be implemented through the rear, without necessitating a detachment of the motor from the gear transmission.

While the invention has been illustrated and described in connection assembly with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A drive unit for operating a plastics injection machine, comprising:
    a receiving member supported for rotation and intended for accommodation of an extruder screw;
    a rotor forming part of an electric machine, said rotor having a hollow shaft which is defined by an inner diameter sized to allow passage of the receiving member and accommodated extruder screw through the rotor, said receiving member extending axially into the hollow shaft; and
    a connection assembly for detachably connecting the rotor in fixed rotative engagement with the receiving member, said connection assembly including a power transmission flange which is attached to a screw-proximal end surface of the hollow shaft, said power transmission flange projecting into the rotor and having an outer circumferential thread for threaded engagement of a restraining nut.

2. The drive unit of claim 1, wherein the connection assembly is disposed in the rotor.

3. The drive unit of claim 2, wherein the restraining nut is threadably engaged inside the rotor to the outer circumferential thread of the power transmission flange for axial support of the receiving member.

4. The drive unit of claim 1, wherein the rotor has a side proximal to the extruder screw, said connection assembly being arranged on said side.

5. The drive unit of claim 4, wherein the connection assembly includes at least one extractable catch which is engageable in the receiving member for torque transmission and axial securement.

6. The drive unit of claim 1, wherein the rotor has a side distal to the extruder screw, said connection assembly being arranged on said side.

7. The drive unit of claim 6, wherein the connection assembly includes a disk connected to the receiving member and detachably mounted to the rotor.

8. The drive unit of claim 7, wherein disk and the receiving member form a single-piece construction.

9. The drive unit of claim 1, and further comprising a bearing assembly for axial support of the rotor and the receiving member.

10. The drive unit of claim 9, wherein the bearing unit includes a separate axial bearing constructed to receive pressure forces in a direction from the extruder screw to the rotor.

11. The drive unit of claim 9, wherein the bearing unit includes a radial bearing constructed to receive tensile forces in a direction from the rotor to the extruder screw, said radial bearing constructed to absorb also axial forces.

12. A plastics injection machine, comprising:
    an extruder screw; and
    a drive unit for operating the extruder screw, said drive unit comprising:
        a receiving member supported for rotation and intended for accommodation of the extruder screw;
        a rotor forming pad of an electric machine, said rotor having a hollow shaft which is defined by an inner diameter sized to allow passage of the receiving member and accommodated extruder screw through the rotor, said receiving member extending axially into the hollow shaft; and
        a connection assembly for detachably connecting the rotor in fixed rotative engagement with the receiving member, said connection assembly including a power transmission flange which is attached to a screw-proximal end surface of the hollow shaft, said power transmission flange projecting into the rotor and having an outer circumferential thread for threaded engagement of a restraining nut.

13. The drive unit of claim 1, wherein the rotor has a rotor winding mounted onto the hollow shaft.

* * * * *